United States Patent
Banno et al.

(10) Patent No.: US 6,838,211 B2
(45) Date of Patent: Jan. 4, 2005

(54) PREGEL COMPOSITIONS FOR POLYMER GEL ELECTROLYTES, METHOD OF DEHYDRATING PREGEL COMPOSITIONS, SECONDARY CELL, AND ELECTRICAL DOUBLE-LAYER CAPACITOR

(75) Inventors: Kimiyo Banno, Chiba (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 147 days.

(21) Appl. No.: 10/086,886

(22) Filed: Mar. 4, 2002

(65) Prior Publication Data

US 2003/0003359 A1 Jan. 2, 2003

(30) Foreign Application Priority Data

Mar. 7, 2001 (JP) ........................................ 2001-062832

(51) Int. Cl.⁷ ................................................. H01M 6/04
(52) U.S. Cl. ....................... 429/189; 429/188; 429/300; 429/309
(58) Field of Search ................................. 429/188, 189, 429/300, 309, 307

(56) References Cited

U.S. PATENT DOCUMENTS 6,190,805 B1 * 2/2001 Takeuchi et al. ............ 429/307

FOREIGN PATENT DOCUMENTS

| JP | 10-334730 A | 12/1998 |
| JP | 11-217350 A | 8/1999 |

* cited by examiner

Primary Examiner—Dah-Wei Yuan
(74) Attorney, Agent, or Firm—Birch, Stewart, Kolasch & Birch, LLP

(57) ABSTRACT

A pregel composition is added to an organic electrolyte solution of an electrolyte salt in a nonaqueous solvent for causing the solution to gel and form a polymer gel electrolyte. The pregel composition is dehydrated by azeotropic distillation and has a moisture content of not more than 1,000 ppm as determined by Karl Fischer titration. Polymer gel electrolytes prepared with such a pregel composition have a good electrochemical stability, and are thus highly suitable for use in secondary cells and electrical double-layer capacitors.

6 Claims, No Drawings

US 6,838,211 B2

PREGEL COMPOSITIONS FOR POLYMER GEL ELECTROLYTES, METHOD OF DEHYDRATING PREGEL COMPOSITIONS, SECONDARY CELL, AND ELECTRICAL DOUBLE-LAYER CAPACITOR

BACKGROUND OF THE INVENTION

1. Field of the Invention

The present invention relates to pregel compositions for use in forming electrochemically stable polymer gel electrolytes, and to a method of dehydrating such pregel compositions. The invention further relates to secondary cells and electrical double-layer capacitors containing polymer gel electrolytes prepared using such pregel compositions.

2. Prior Art

Polymer gel electrolytes prepared by using a pregel composition to gel an organic electrolyte solution of an electrolyte salt in a nonaqueous solvent are currently seeing use as electrolytes in nonaqueous secondary cells and electrical double-layer capacitors. Such polymer gel electrolytes must be electrochemically stable. This requires that both the organic electrolyte solution and the pregel composition be sufficiently free of water. Pregel compositions which have not been sufficiently dehydrated are undesirable. Also undesirable are pregel compositions which contain residual amounts of organic solvents that lower the electrochemical properties, pregel compositions which contain residual amounts of impurities that adsorb to the electrolyte, electrode surfaces or separator, and pregel compositions which have begun to polymerize and thus have a higher viscosity that keeps them from fully penetrating the separator and electrodes.

A number of possible approaches for dehydrating pregel compositions immediately come to mind, such as lowering the viscosity with a co-solvent and using a dehydrating adsorbent to effect dehydration, or removing water by means of distillation. Specific examples from the prior-art include:

(1) a method for dehydrating organic electrolyte solutions using a dehydrating adsorbent such as a molecular sieve or finely divided alumina (JP-A 10-334730);

(2) a method, similar to that commonly used for polymer dehydration, which involves warming, then dehydration by means of distillation or azeotropic boiling (JP-A 11-217350).

However, dehydration methods which are carried out using dehydrating adsorbents such as molecular sieves or finely divided alumina impart adverse electrochemical effects on account of, for example:

(1) the residual presence of co-solvent used to lower the viscosity;

(2) the introduction of impurities from the molecular sieve or finely divided alumina;

(3) the adhesion and remaining presence of molecular sieve or finely divided alumina on the electrolyte, negative electrode surface or separator; and (4) lack of a sufficient decrease in the moisture content.

Dehydration by means of distillation also presents serious drawbacks.

(1) The temperature and time requirements for such distillation invite reactive double bond-bearing compounds to begin polymerizing.

(2) In the case of azeotropic distillation, traces of the organic solvent used as the entrainer remain behind, lowering the electrochemical properties of the polymer gel electrolyte.

SUMMARY OF THE INVENTION

It is therefore one object of the present invention to provide pregel compositions for use in forming polymer gel electrolytes, which compositions have been adequately dehydrated and have a low moisture content. Another object of the invention is to provide a dehydration method for obtaining such low-moisture pregel compositions. Further objects are to provide secondary cells and electrical double-layer capacitors which contain polymer gel electrolytes prepared with the use of such low-moisture pregel compositions.

We have found that polymer gel electrolyte-forming pregel compositions having a low moisture content can be prepared with greater ease, i.e., in less time and at a lower temperature, than in the prior art by a dehydration process in which azeotropic distillation is carried out using as the entrainer the nonaqueous solvent in the organic electrolyte solution from which the polymer gel electrolyte prepared. We have also discovered that such use, as the entrainer, of the nonaqueous solvent employed in the organic electrolyte solution for preparing the polymer gel electrolyte for a secondary cell or electrical double-layer capacitor results in no detriment to the secondary cell or capacitor performance should a small amount of the entrainer remain within the pregel composition following dehydration by azeotropic distillation.

Accordingly, in a first aspect, the invention provides a pregel composition which, when added to an organic electrolyte solution of an electrolyte salt in a nonaqueous solvent, causes the solution to gel and form a polymer gel electrolyte. The pregel composition has a moisture content, as determined by Karl Fischer titration, of not more than 1,000 ppm.

In one preferred embodiment, the pregel composition contains at least one substance capable of reacting to form a polymer gel electrolyte.

In another preferred embodiment, the pregel composition contains at least one compound having a reactive double bond.

In yet another preferred embodiment, the pregel composition contains at least one linear or branched polymeric compound and a compound having a reactive double bond.

In still another preferred embodiment, the pregel composition contains at least one isocyanate compound.

The pregel composition is typically prepared by azeotropic distillation in the presence of an entrainer that is the nonaqueous solvent in the organic electrolyte solution.

In a second aspect, the invention provides a method for dehydrating a pregel composition which, when added to an organic electrolyte solution of an electrolyte salt in a nonaqueous solvent, causes the solution to gel and form a polymer gel electrolyte. In the dehydration method, the pregel composition is subjected to azeotropic distillation in the presence of an entrainer so as to lower the moisture content of the pregel composition, as determined by Karl Fischer titration, to not more than 1,000 ppm. The entrainer is the nonaqueous solvent in the organic electrolyte solution.

In a third aspect, the invention provides a secondary cell having a positive electrode, a negative electrode and an electrolyte, in which cell the electrolyte is a polymer gel electrolyte prepared by adding the pregel composition according to the above-described first aspect of the invention to an organic electrolyte solution of an electrolyte salt in a nonaqueous solvent, thereby inducing gelation.

In a fourth aspect, the invention provides an electrical double-layer capacitor having a pair of polarizable electrodes and an electrolyte between the polarizable electrodes, in which capacitor the electrolyte is a polymer gel electrolyte prepared by adding the pregel composition according to the above first aspect of the invention to an organic electrolyte solution of an electrolyte salt in a nonaqueous solvent, thereby inducing gelation.

DETAILED DESCRIPTION OF THE INVENTION

The inventive pregel composition for use in forming polymer gel electrolytes has a moisture content, as determined by Karl Fischer titration, of not more than 1,000 ppm, preferably not more than 500 ppm, more preferably not more than 200 ppm, even more preferably not more than 100 ppm, still more preferably not more than 50 ppm, and most preferably not more than 30 ppm.

The pregel composition is made up of (I) a reactive double bond-bearing compound, (II) a linear or branched polymeric compound in combination with a reactive double bond-bearing compound, or (III) an isocyanate group-bearing compound in combination with a compound having at least two active hydrogens capable of reacting with the isocyanate group. When heated or exposed to a suitable form of radiation, such as ultraviolet light, electron beams, microwaves or radio-frequency radiation, the composition forms a three-dimensional network structure and can thus transform into a gel an organic electrolyte composed of an electrolyte salt dissolved in a nonaqueous solvent.

Polymeric materials (I) to (III) have high adhesive properties, and so their use can increase the physical strength of the polymer gel electrolyte. Composition (II) made up of a linear or branched polymeric compound in combination with a reactive double bond-bearing organic compound forms an interpenetrating network structure or a semi-interpenetrating network structure, and thus provides a high affinity between electrolyte solvent molecules and ionic molecules. In addition, it allows for a high ion mobility, can dissolve the electrolyte salt to a high concentration, and has a high ionic conductivity.

Examples of the reactive double bond-bearing compound (I) above include (1) unsaturated polyurethane compounds, (2) polyoxyalkylene component-bearing unsaturated compounds, and (3) reactive double bond-bearing compounds other than (1) and (2) above.

The unsaturated polyurethane compound (1) is preferably one prepared by reacting (A) an unsaturated alcohol having at least one (meth)acryloyl group and a hydroxyl group on the molecule, (B) a polyol compound, (C) a polyisocyanate compound, and (D) an optional chain extender.

The unsaturated alcohol serving as component (A) is not subject to any particular limitation, provided the molecule bears at least one (meth)acryloyl group and a hydroxyl group. Illustrative examples include 2-hydroxyethyl acrylate, 2-hydroxypropyl acrylate, 2-hydroxyethyl methacrylate, 2-hydroxylpropyl methacrylate, diethylene glycol monoacrylate, diethylene glycol monomethacrylate, triethylene glycol monoacrylate and triethylene glycol monomethacrylate.

The polyol compound serving as component (B) may be, for example, a polyether polyol such as polyethylene glycol, polypropylene glycol, polyoxytetramethylene glycol, ethylene glycol-propylene glycol copolymer or ethylene glycol-oxytetramethylene glycol copolymer; or a polyester polyol such as polycaprolactone. A polyol compound of general formula (1) below is especially preferred.

(1)

In the foregoing formula, $R^1$ and $R^2$ are each independently a divalent hydrocarbon group of 1 to 10 carbons, and preferably 1 to 6 carbons, which may contain an amino, nitro, carbonyl or ether group. Alkylene groups such as methylene, ethylene, trimethylene, propylene, ethylene oxide and propylene oxide are especially preferred. Y is —COO—, —OCOO—, —$NR^3$CO— ($R^3$ being a hydrogen atom or an alkyl group of 1 to 4 carbons), —O— or an arylene group such as phenylene. The letters h, i and j are each independently 0 or an integer from 1 to 10. The letter q is a number which is 1 or larger, preferably 5 or larger, and most preferably from 10 to 200.

The polyol compound serving as component (B) has a number-average molecular weight within a range of preferably 400 to 10,000, and more preferably 1,000 to 5,000.

Illustrative examples of the polyisocyanate compound serving as component (C) include aromatic diisocyanates such as tolylene diisocyanate, 4,4'-diphenylmethane diisocyanate, p-phenylene diisocyanate, 1,5-naphthylene diisocyanate, 3,3'-dichloro-4,4'-diphenylmethane diisocyanate and xylylene diisocyanate; and aliphatic or alicyclic diisocyanates such as hexamethylene diisocyanate, isophorone diisocyanate, 4,4'-dicyclohexylmethane diisocyanate and hydrogenated xylylene diisocyanate.

The above-described unsaturated polyurethane compound (1) is preferably one prepared from above components (A) to (C) and also, if necessary, a chain extender. Any chain extender commonly employed in the preparation of thermoplastic polyurethane resins may be used. Illustrative examples include aliphatic diols such as ethylene glycol, diethylene glycol, propylene glycol, 1,3-propanediol, 1,4-butanediol, 1,5-pentanediol, 1,6-hexanediol, 1,7-heptanediol, 1,8-octanediol and 1,9-nonanediol; aromatic or alicyclic diols such as 1,4-bis(β-hydroxyethoxy)benzene, 1,4-cyclohexanediol, bis(β-hydroxyethyl) terephthalate and xylylene glycol; diamines such as hydrazine, ethylenediamine, hexamethylenediamine, propylenediamine, xylylenediamine, isophoronediamine, piperazine, piperazine derivatives, phenylenediamine and tolylenediamine; and amino alcohols such as adipoyl hydrazide and isophthaloyl hydrazide. Any one or combinations of two or more of these may be used.

Use may also be made of a urethane prepolymer prepared by preliminary reaction of the polyol compound serving as component (B) with the polyisocyanate compound serving as component (C).

In preparing an unsaturated polyurethane compound (1) for use in the invention, it is advantageous to react components (A) to (D) in the following proportions:
(A) 100 parts by weight of the unsaturated alcohol;
(B) 100 to 20,000 parts by weight, and preferably 1,000 to 10,000 parts by weight, of the polyol compound;
(C) 80 to 5,000 parts by weight, and preferably 300 to 2,000 parts by weight, of the polyisocyanate compound; and, optionally,
(D) 5 to 1,000 parts by weight, and preferably 10 to 500 parts by weight, of the chain extender.

Examples of unsaturated polyurethane compounds (1) that can be prepared as described above include the following compounds. Any one or combinations of two or more of these unsaturated polyurethane compounds may be used in the present invention.

(i) 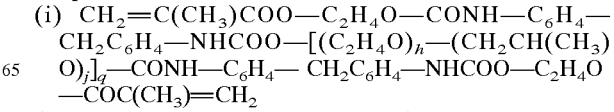

(wherein h is 7, j is 3, and q is 5 to 7)

Component A: hydroxyethyl methacrylate

Component B: ethylene oxide/propylene oxide random copolymer diol (in general formula (1) above, the ratio h/j is 7/3; the number-average molecular weight is about 3,000)

Component C: 4,4'-diphenylmethane diisocyanate (ii) $CH_2=C(CH_3)COO-C_2H_4O-CONH-C_6H_4-CH_2C_6H_4-NHCOO-\{[(C_2H_4O)_h(CH_2CH(CH_3)O)_3]_q-CONH-C_6H_4-CH_2C_6H_4-NHCOO-C_4H_6O\}_r-CONH-$ (wherein h is 7, j is 3, q is 5 to 7, and r is 2 to 20)

Component A: hydroxyethyl methacrylate

Component B: ethylene oxide/propylene oxide random copolymer diol (in general formula (1) above, the ratio h/j is 7/3; the number-average molecular weight is about 3,000)

Component C: 4,4'-diphenylmethane diisocyanate

Component D: 1,4-butanediol (iii) $CH_2=C(CH_3)COO-C_2H_4O-CONH-C_6H_7(CH_3)_3-CH_2-NHCOO-[(C_2H_4O)_h(CH_2CH(CH_3)O)_j]_q-CONH-C_6H_7(CH_3)_3-CH_2-NHCOO-C_2H_4O-COC(CH_3)=CH_2$ (wherein h is 7, j is 3, and q is 5 to 7)

Component A: hydroxyethyl methacrylate

Component B: ethylene oxide/propylene oxide random copolymer diol (in general formula (1) above, the ratio h/j is 7/3; the number-average molecular weight is about 3,000)

Component C: isophorone diisocyanate (iv) $CH_2=C(CH_3)COO-C_2H_4O-CONH-C_6H_4-CH_2C_6H_4-NHCOO-CH_2CH_2O-(COC_5H_{10}O)_s-CH_2CH_2O-CONH-C_6H_4-CH_4C_6H_4-NHCOO-C_2H_4O-COC(CH_3)=CH_2$ (wherein s is 20 to 30)

Component A: hydroxyethyl methacrylate

Component B: polycaprolactone diol (number-average molecular weight, about 3,000)

Component C: 4,4'-diphenylmethane diisocyanate

The resulting unsaturated polyurethane compound has a number-average molecular weight within a range of preferably 1,000 to 50,000, and most preferably 3,000 to 30,000. Too small a number-average molecular weight results in the cured gel having a small molecular weight between crosslink sites, which may impart the polymer gel electrolyte with insufficient flexibility. On the other hand, a number-average molecular weight that is too large may cause the viscosity of the polymer electrolyte solution before the gel cures to become so large as to make the gel difficult to incorporate into a secondary battery or an electrical double-layer capacitor.

In the practice of the invention, concomitant use may also be made of a monomer which is copolymerizable with the unsaturated polyurethane compound. Examples of such monomers include acrylonitrile, methacrylonitrile, acrylic acid esters, methacrylic acid esters and N-vinylpyrrolidone. The concomitant use of acrylonitrile or methacrylonitrile is advantageous for increasing the strength of the polymer gel electrolyte without compromising its ionic conductivity. The monomer component copolymerizable with the unsaturated polyurethane compound is typically included in an amount, expressed in mole equivalents of unsaturated double bonds per liter of the electrolyte solution prior to curing of the gel, of 0.5 to 5.0, and preferably 1.0 to 2.5. Too little monomer component may fail to produce a sufficient crosslinking reaction, and may in turn fail to result in gelation. On the other hand, too much monomer component may lower the molecular weight between crosslink sites to such a degree as to result in an excessive decline in the flexibility of the polymer gel electrolyte.

Illustrative examples of polyoxyalkylene component-bearing unsaturated compounds (2) include compounds containing two or more reactive double bonds, such as ethylene glycol dimethacrylate, diethylene glycol dimethacrylate, triethylene glycol dimethacrylate, polyethylene glycol dimethacrylates (average molecular weight, 200 to 1,000), 1,3-butylene glycol dimethacrylate, neopentyl glycol dimethacrylate, polypropylene glycol dimethacrylates (average molecular weight, 400), ethylene glycol diacrylate, diethylene glycol diacrylate, triethylene glycol diacrylate, polyethylene glycol diacrylates (average molecular weight, 200 to 1,000). 1,3-butylene glycol diacrylate, neopentyl glycol diacrylate, polypropylene glycol diacrylates (average molecular weight, 400), and the above-described unsaturated polyurethane compounds (1).

Illustrative examples of reactive double bond-bearing compounds (3) other than (1) and (2) above include divinylbenzene, divinylsulfone, allyl methacrylate, 1,6-hexanediol dimethacrylate. 2-hydroxy-1.3-dimethacryloxypropane. 2,2-bis[4-(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, 1,6-hexanediol diacrylate, 2-hydroxy-1,3-diacryloxypropane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, trimethylolpropane triacrylate, trimethylolpropane trimethacrylate, tetramethylolmethane triacrylate, tetramethylolmethane tetraacrylate, tricyclodecane dimethanol acrylate, hydrogenated dicyclopentadiene diacrylate, polyester diacrylate, and polyester dimethacrylate.

If necessary, a compound containing an acrylic or methacrylic group may be added. Examples of such compounds include acrylates and methacrylates such as glycidyl methacrylate, glycidyl acrylate and tetrahydrofurfuryl methacrylate, as well as methacryloyl isocyanate, 2-hydroxymethylmethacrylic acid and N,N-dimethylaminoethylmethacrylic acid. Still other reactive double bond-containing compounds may also be added, including acrylamides (e.g., N-methylolacrylamide, methylenebisacrylamide, diacetoneacrylamide) and vinyl compounds (e.g., vinyloxazolines, vinylene carbonate).

To react the foregoing reactive double bond-bearing compounds and form a three-dimensional network structure, a compound having at least two reactive double bonds must be added. That is, a three-dimensional network structure cannot be formed with only compounds such as methyl methacrylate that have but a single reactive double bond. Some addition of a compound bearing at least two reactive double bonds is required.

Of the aforementioned reactive double bond-bearing compounds, especially preferred reactive monomers include the above-described unsaturated polyurethane compounds (1) and polyoxyalkylene component-bearing diesters of general formula (2) below. The use of the either of these in combination with a polyoxyalkylene component-bearing monoester of formula (3) below is recommended. An unsaturated polyurethane compound is preferable to a polyoxyalkylene component-bearing unsaturated compound in terms of physical strength and other properties.

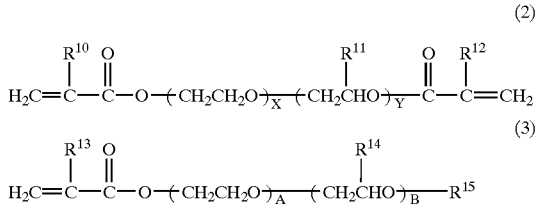

In formula (2), $R^{10}$, $R^{11}$ and $R^{12}$ are each independently a hydrogen atom or an alkyl group having 1 to 6 carbons, and preferably 1 to 4 carbons, such as methyl, ethyl, n-propyl, i-propyl, n-butyl, i-butyl, s-butyl or t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^{10}$, $R^{11}$ and $R^{12}$ are most preferably methyl, ethyl, n-propyl, i-propyl, n-butyl, i-butyl, s-butyl or t-butyl.

In formula (3), $R^{13}$, $R^{14}$ and $R^{15}$ are each independently a hydrogen atom or an alkyl group having 1 to 6 carbons, and preferably 1 to 4 carbons, such as methyl, ethyl, n-propyl, i-propyl, n-butyl, i-butyl, s-butyl or t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^{13}$, $R^{14}$ and $R^{15}$ are most preferably methyl, ethyl, n-propyl, i-propyl, n-butyl, i-butyl, s-butyl or t-butyl.

Typically, the above-described unsaturated polyurethane compound (1) or polyoxyalkylene component-bearing diester and the polyoxyalkylene component-bearing monoester are heated or exposed to a suitable form of radiation (e.g., electron beams, microwaves, radio-frequency radiation) within the polymer electrolyte composition, or a mixture of the compounds is heated, thereby forming a three-dimensional network structure.

The three-dimensional network structure can generally be formed by reacting only the unsaturated polyurethane compound (1) or polyoxyalkylene component-bearing diester described above. However, as already noted, the addition of a monofunctional monomer, and specifically a polyoxyalkylene component-bearing monoester, to the unsaturated polyurethane compound or polyoxyalkylene component-bearing diester is preferred because such addition introduces polyoxyalkylene branched chains onto the three-dimensional network.

No particular limitation is imposed on the relative proportions of the unsaturated polyurethane compound or polyoxyalkylene component-bearing diester and the polyoxyalkylene component-bearing monoester, although a weight ratio (unsaturated polyurethane compound or polyoxyalkylene component-bearing diester)/(polyoxyalkylene component-bearing monoester) within a range of 0.2 to 10, and especially 0.5 to 5, is preferred because this enhances the film strength of the polymer gel electrolyte.

The reactive double bond-bearing compound serving as component (I) is typically included in an amount of 1 to 40 wt %, and preferably 3 to 20 wt %, based on the overall polymer gel electrolyte.

The above-mentioned combination of a linear or branched polymeric compound with a reactive double bond-bearing compound (II), is now described. These compounds are used together to form an interpenetrating or semi-interpenetrating network structure. Illustrative examples include:

(A) pregel compositions which are combinations of (a) a hydroxyalkyl polysaccharide derivative with the above-described reactive double bond-bearing compound (I), (B) pregel compositions which are combinations of (b) a polyvinyl alcohol derivative with above reactive double bond-bearing compound (I), and (C) pregel compositions which are combinations of (c) a polyglycidol derivative with reactive double bond-bearing compound (I).

Any of the following may be used as the hydroxyalkyl polysaccharide derivative serving as above component (a) of pregel composition A:

(i) hydroxyethyl polysaccharides prepared by reacting ethylene oxide with a naturally occurring polysaccharide such as cellulose, pullulan or starch, (ii) hydroxypropyl polysaccharides prepared by similarly reacting instead propylene oxide, (iii) dihydroxypropyl polysaccharides prepared by similarly reacting instead glycidol or 3-chloro-1,2-propanediol. Some or all of the hydroxyl groups on these hydroxyalkyl polysaccharides may be capped with an ester-bonded or ether-bonded substituent.

Illustrative examples of such polysaccharides include cellulose, starch, amylose, amylopectin, pullulan, curdlan, mannan, glucomannan, arabinan, chitin, chitosan, alginic acid, carrageenan and dextran. The polysaccharide is not subject to any particular limitations with regard to molecular weight, the presence or absence of a branched structure, the type and arrangement of constituent sugars in the polysaccharide and other characteristics. The use of cellulose and pullulan is especially preferred, in part because of their ready availability.

A method of synthesizing dihydroxypropyl cellulose is described in U.S. Pat. No. 4,096,326. Other dihydroxypropyl polysaccharides can be synthesized by known methods, such as those described by Sato et al. in *Makromol. Chem.* 193, p. 647 (1992) or in *Macromolecules* 24, p. 4691 (1991).

Hydroxyalkyl polysaccharides that may be used in the invention have a molar degree of substitution of at least 2. At a molar substitution below 2, the ability to dissolve ion-conductive metal salts becomes so low as to make use of the hydroxyalkyl polysaccharide impossible. The upper limit in the molar substitution is preferably 30, and more preferably 20. The industrial synthesis of hydroxyalkyl polysaccharides having a molar substitution greater than 30 can be difficult on account of industrial production costs and the complexity of the synthesis operations. Moreover, even if one does go to the extra trouble of producing hydroxyalkyl polysaccharides having a molar substitution greater than 30, the increase in electrical conductivity resulting from the higher molar substitution is not likely to be very large.

The hydroxyalkyl polysaccharide derivative serving as component (a) is one in which at least 10% of the terminal OH groups on the molecular chains of the above-described hydroxyalkyl polysaccharide have been capped with one or more monovalent group selected from among halogen atoms, substituted or unsubstituted monovalent hydrocarbon groups, $R^4CO-$ groups (wherein $R^4$ is a substituted or unsubstituted monovalent hydrocarbon group), $R^4Si-$ groups (wherein $R^4$ is the same as above), amino groups, alkylamino groups, $H(OR^5)_m-$ groups (wherein $R^5$ is an alkylene group of 2 to 5 carbons, and the letter m is an integer from 1 to 100), and phosphorus-containing groups.

Substituted or unsubstituted monovalent hydrocarbon groups that may be used include alkyl, aryl, aralkyl and alkenyl groups on which some or all of the hydrogen atoms may be substituted with, for example, halogen atoms, cyano groups, hydroxyl groups, $H(OR^5)_m-$ groups, amino groups, aminoalkyl groups or phosphono groups. The monovalent hydrocarbon group has preferably 1 to 10 carbons.

The terminal OH groups may be capped using any known method for introducing the respective groups. The hydroxyalkyl polysaccharide derivative serving as w component (a) is typically included in an amount of 0.01 to 30 wt %, and preferably 0.5 to 20 wt %, based on the overall polymer gel electrolyte.

In the polyvinyl alcohol derivative serving as component (b) of above pregel composition B, some or all of the hydroxyl groups on the polymeric compound having oxyalkylene chain-bearing polyvinyl alcohol units may be substituted. Here, "hydroxyl groups" a refers collectively to remaining hydroxyl groups from the polyvinyl alcohol units and hydroxyl groups on the oxyalkylene-containing groups introduced onto the molecule.

The polymeric compound having polyvinyl alcohol units has an average degree of polymerization (number of polyvinyl alcohol units in molecule) of at least 20, preferably at least 30, and most preferably at least 50. Some or all of the hydroxyl groups on the polyvinyl alcohol units are substituted with oxyalkylene-containing groups. The upper limit in the average degree of polymerization is preferably no higher than 2,000, and most preferably no higher than 200. The average degree of polymerization refers herein to the number-average degree of polymerization. Polymeric compounds with too high a degree of polymerization have an excessively high viscosity, making them difficult to handle. Accordingly, the range in the degree of polymerization is preferably from 20 to 500 monomeric units.

These polyvinyl alcohol units make up the backbone of the polyvinyl alcohol derivative and have the following general formula (4).

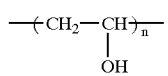

(4)

In formula (4), the letter n is at least 20, preferably at least 30, and most preferably at least 50. The upper limit for n is preferably no higher than 2,000, and most preferably no higher than 200.

It is highly advantageous for the polyvinyl alcohol unit-containing polymeric compound to be a homopolymer which satisfies the above range in the average degree of polymerization and for which the fraction of polyvinyl alcohol units in the molecule is at least 98 mol %. However, use can also be made of, without particular limitation, polyvinyl alcohol unit-containing polymeric compounds which satisfy the above range in the average degree of polymerization and have a polyvinyl alcohol fraction of preferably at least 60 mol %, and more preferably at least 70 mol %. Illustrative examples include polyvinylformal in which some of the hydroxyl groups on the polyvinyl alcohol have been converted to formal, modified polyvinyl alcohols in which some of the hydroxyl groups on the polyvinyl alcohol have been alkylated, polyethylene vinyl alcohol), partially saponified polyvinyl acetate, and other modified polyvinyl alcohols.

Some or all of the hydroxyl groups on the polyvinyl alcohol units of the polymeric compound are substituted with oxyalkylene-containing groups (moreover, some of the hydrogen atoms on these oxyalkylene groups may be substituted with hydroxyl groups) to an average molar substitution of at least 0.3. The proportion of hydroxyl groups substituted with oxyalkylene-containing groups is preferably at least 30 mol %, and more preferably at least 50 mol %.

The average molar substitution (MS) can be determined by accurately measuring the weight of the polyvinyl alcohol charged and the weight of the reaction product. Let us consider, for example, a case in which 10 g of polyvinyl alcohol (PVA) is reacted with ethylene oxide, and the weight of the resulting PVA derivative is 15 g. The PVA units have the formula —(CH$_2$CH(OH))—, and so their unit molecular weight is 44. In the PVA derivative obtained as the reaction product, the —OH groups on the original —(CH$_2$CH (OH))— units have become —O—(CH$_2$CH$_2$O)$_n$—H groups, and so the unit molecular weight of the reaction product is 44+44n. Because the increase in weight associated with the reaction is represented by 44n, the calculation is carried out as follows.

$$\frac{PVA}{PVA \text{ derivative}} = \frac{44}{44 + 44n} = \frac{10 \text{ g}}{15 \text{ g}}$$

$$440 + 440n = 660$$

$$n = 0.5$$

Hence, the molar substitution in this example is 0.5. Of course, this value merely represents the average molar substitution and does not give any indication of, for example, the number of unreacted PVA units on the molecule or the length of the oxyethylene groups introduced onto the PVA by the reaction.

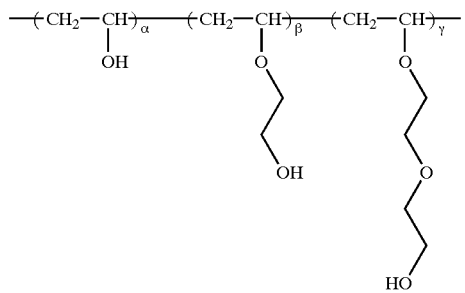

$\alpha + \beta + \gamma = 1$ $MS = 0$ unit  $MS = 1$ unit  $MS = 2$ units

Average $MS = \dfrac{0 + 1 + 2}{3} = 1$

Suitable methods for introducing oxyalkylene-containing groups onto the above polyvinyl alcohol unit-containing polymeric compound include (1) reacting the polyvinyl alcohol unit-containing polymeric compound with an oxirane compound such as ethylene oxide, and (2) reacting the polyvinyl alcohol unit-containing polymeric compound with a polyoxyalkylene compound having a hydroxy-reactive substituent on the end.

In above method (1), the oxirane compound may be any one or combination selected from among ethylene oxide, propylene oxide and glycidol.

If ethylene oxide is reacted in this case, oxyethylene chains are introduced onto the polymeric compound as shown in the following formula.

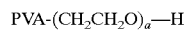

In the formula, the letter a is preferably from 1 to 10, and most preferably from 1 to 5.

If propylene oxide is reacted instead, oxypropylene chains are introduced onto the polymeric compound as shown below.

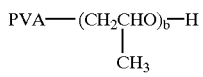

PVA—(CH$_2$CHO)$_b$—H
     |
     CH$_3$

In the formula, the letter b is preferably from 1 to 10, and most preferably from 1 to 5.

And if glycidol is reacted, two branched chains (1) and (2) are introduced onto the compound, as shown below.

Reaction of a hydroxyl group on the PVA with glycidol can proceed in either of two ways: a attack or b attack.

The reaction of one glycidol molecule creates two new hydroxyl groups, each of which can in turn react with glycidol. As a result, the two following branched chains (1) and (2) are introduced onto the hydroxyl groups of the PVA units.

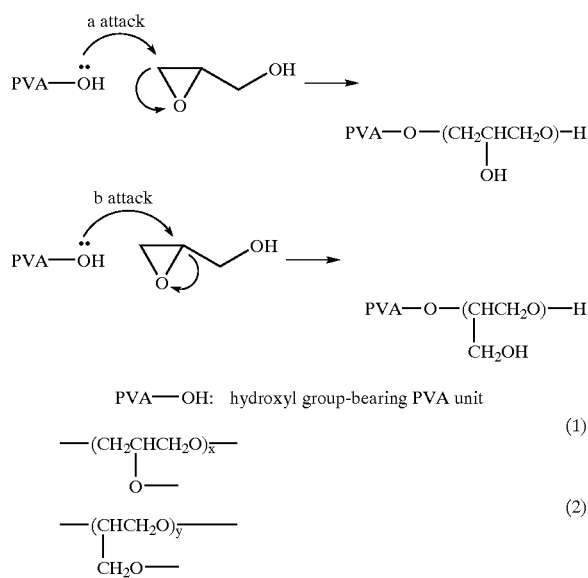

In branched chains (1) and (2), the value x+y is preferably from 1 to 10, and most preferably from 1 to 5. The ratio of x to y is not particularly specified, although x:y generally falls within a range of 0.4:0.6 to 0.6:0.4.

The reaction of the polyvinyl alcohol unit-containing polymeric compound with the above oxirane compound can be carried out using a basic catalyst such as sodium hydroxide, potassium hydroxide or any of various amine compounds.

The reaction of polyvinyl alcohol with glycidol is described for the purpose of illustration. First, the reaction vessel is charged with a solvent and polyvinyl alcohol. It is not essential in this case for the polyvinyl alcohol to dissolve in the solvent. That is, the polyvinyl alcohol may be present in the solvent either in a uniformly dissolved state or in a suspended state. A given amount of a basic catalyst, such as aqueous sodium hydroxide, is added and stirred for a while into the solution or suspension, following which glycidol diluted with a solvent is added. Reaction is carried out at a given temperature for a given length of time, after which the polyvinyl alcohol is removed. If the polyvinyl alcohol is present within the reaction mixture in an undissolved form, it is separated off by filtration using a glass filter, for example. If, on the other hand, the polyvinyl alcohol is in solution within the reaction mixture, it is precipitated out of solution by pouring an alcohol or other suitable precipitating agent into the reaction mixture, following which the precipitate is separated off using a glass filter or the like. The modified polyvinyl alcohol product is purified by dissolution in water, neutralization, and either passage through an ion-exchange resin or dialysis. The purified product is then freeze-dried, giving a dihydroxypropylated polyvinyl alcohol.

In the reaction, the molar ratio between the polyvinyl alcohol and the oxirane compound is preferably 1:10, and most preferably 1:20.

The polyoxyalkylene compound having a hydroxy-reactive substituent at the end used in above method (2) may be a compound of general formula (5) below $$A\text{-}(R^7O)_m\text{—}R^6 \qquad (5)$$

In formula (5), the letter A represents a monovalent substituent having reactivity with hydroxyl groups. Illustrative examples include isocyanate groups, epoxy groups, carboxyl groups, acid chloride groups, ester groups, amide groups, halogen atoms such as fluorine, bromine and chlorine, silicon-bearing reactive substituents, and other monovalent substituents capable of reacting with hydroxyl groups. Of these, isocyanate groups, epoxy groups, and acid chloride groups are preferred on account of their reactivity.

The carboxyl group may also be an acid anhydride. Preferred ester groups are methyl ester and ethyl ester groups. Examples of suitable silicon-bearing reactive substituents include substituents having terminal SiH or SiOH groups.

The hydroxy-reactive group, such as isocyanate or epoxy, may be bonded directly to the oxyalkylene group $R^7O$ or through, for example, an intervening oxygen atom, sulfur atom, carbonyl group, carbonyloxy group, nitrogenous group (e.g., NH—, N(CH$_3$)—, N(C$_2$H$_5$)—) or SO$_2$ group. Preferably, the hydroxy-reactive group is bonded to the oxyalkylene group $R^7O$ through, for example, an alkylene, alkenylene or arylene group having 1 to 10 carbons, and especially 1 to 6 carbons.

Examples of polyoxyalkylene groups bearing this type of substituent A that may be used are the products obtained by reacting a polyisocyanate compound at the hydroxyl end group of a polyoxyalkylene group. Isocyanate group-bearing compounds that may be used for this purpose include compounds having two or more isocyanate groups on the molecule, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate. For example, use can be made of compounds obtained from the following reaction.

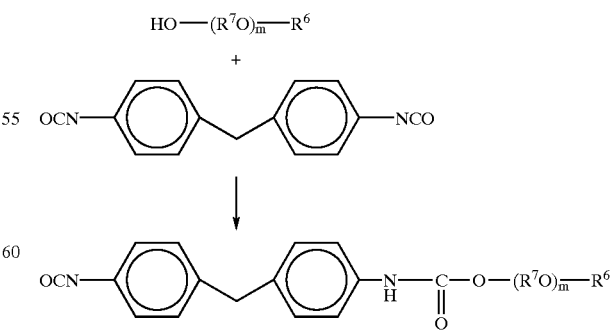

In the formula, $R^7O$ is an oxyalkylene group of 2 to 5 carbons, examples of which include —CH$_2$CH$_2$O—, —CH$_2$CH$_2$CH$_2$O—, —CH$_2$CH(CH$_3$)O—, —CH$_2$CH (CH₂CH₃)O— and —CH₂CH₂CH₂CH₂O—. The letter m represents the number of moles of the oxyalkylene group added. This number of added moles (m) is preferably from 1 to 100, and most preferably from 1 to 50.

Here, the polyoxyalkylene chain represented by above formula $(R^7O)_m$ is most preferably a polyethylene glycol chain, a polypropylene glycol chain or a polyethylene oxide (EO)/polypropylene oxide (PO) copolymer chain. The weight-average molecular weight of the polyoxyalkylene chain is preferably from 100 to 3,000, and most preferably within the range of 200 to 1,000 at which the compound is liquid at room temperature.

$R^6$ in the above formula is a capping moiety for one end of the chain. This represents a hydrogen atom, a substituted or unsubstituted monovalent hydrocarbon group having 1 to 10 carbons, or a $R^8CO$— group (wherein $R^8$ is a substituted or unsubstituted monovalent hydrocarbon group having 1 to 10 carbons).

Illustrative examples of $R^8CO$— groups that may be used as the capping moiety include those in which $R^8$ is a a substituted or unsubstituted monovalent hydrocarbon group of 1 to 10 carbons. Preferred examples of $R^8$ include alkyl or phenyl groups which may be substituted with cyano, acyl groups, benzoyl groups and cyanobenzoyl groups.

The foregoing substituted or unsubstituted monovalent hydrocarbon groups of 1 to 10 carbons are exemplified by the same groups as those mentioned above for $R^4$. Such groups having 1 to 8 carbons are especially preferred.

The reaction between the above-described polyvinyl alcohol unit-containing polymeric compound and the above-described polyoxyalkylene compound having a hydroxy-reactive substituent at the end may be carried out in a suitable solvent.

In the reaction, the molar ratio between the polyvinyl alcohol and the polyoxyalkylene compound having a hydroxy-reactive substituent at the end is preferably in a range of 1:1 to 1:20, and most preferably 1:1 to 1:10.

The structure of the polymeric compound in which oxyalkylene-containing groups have been introduced onto polyvinyl alcohol units can be verified by $^{13}$C-NMR spectroscopy.

The extent to which the oxyalkylene chain-bearing polyvinyl alcohol unit-containing polymeric compound contains oxyalkylene groups can be determined using various analytical techniques such as NMR and elemental analysis, although a method of determination based on the weight of the polymer charged as a reactant and the increase in weight of the polymer formed by the reaction is simple and convenient. For example, determination from the yield may be carried out by precisely measuring both the weight of the polyvinyl alcohol unit-containing polymeric compound that is charged and the weight of the oxyalkylene group-bearing polyvinyl alcohol unit-containing polymeric compound obtained from the reaction, then using this difference to calculate the quantity of oxyalkylene chains that have been introduced onto the molecule (referred to hereinafter as the average molar substitution, or "MS").

The average molar substitution serves here as an indicator of the number of moles of oxyalkylene groups that have been introduced onto the molecule per polyvinyl alcohol unit. In the polymeric compound of the invention, the average molar substitution must be at least 0.3, and is preferably at least 0.5, more preferably at least 0.7 and most preferably at least 1.0. No particular upper limit is imposed on the average molar substitution, although a value not higher than 20 is preferred. Too low an average molar substitution may result in a failure of the ion-conductive salt to dissolve, lower ion mobility and lower ionic conductivity. On the other hand, increasing the average molar substitution beyond a certain level fails to yield any further change in the solubility of the ion-conductive salt or ion mobility and is thus pointless.

Depending on its average degree of polymerization, the oxyalkylene chain-bearing polyvinyl alcohol unit-containing polymeric compound used as component (b) of pregel composition B varies in appearance at room temperature (20° C.) from a highly viscous molasses-like liquid to a rubbery solid. The higher the average molecular weight, the more the compound, with its low fluidity, qualifies as a solid at room temperature, albeit a soft, paste-like solid.

Regardless of its average degree of polymerization, this polymeric compound is not a linear polymer. Rather, due to the interlocking of its highly branched molecular chains, it is an amorphous polymer.

The polyvinyl alcohol derivative used as component (b) can be prepared by capping some or all of the hydroxyl groups on the molecule (these being the sum of the remaining hydroxyl groups from the polyvinyl alcohol units and the hydroxyl groups on the oxyalkylene-containing groups introduced onto the molecule), and preferably at least 10 mol %, with one or more monovalent substituent selected from among halogen atoms, substituted or unsubstituted monovalent hydrocarbon groups having 1 to 10 carbons, $R^9CO$— groups (wherein $R^9$ is a substituted or unsubstituted monovalent hydrocarbon group of 1 to 10 carbons), $R^9{}_3Si$— groups ($R^9$ being as defined above), amino groups, alkylamino groups and phosphorus-containing groups.

The foregoing substituted or unsubstituted monovalent hydrocarbon groups of 1 to 10 carbons are exemplified by the same groups as those mentioned above for $R^4$. Such groups having 1 to 8 carbons are preferred, with cyanoethyl, methyl, ethyl and acetyl being especially preferred.

Capping may be carried out using known techniques for introducing various suitable substituents onto hydroxyl end groups.

The above-described polyvinyl alcohol derivative serving as component (b) is typically included in an amount of 0.01 to 30 wt S, and preferably 0.5 to 20 wt %, based on the overall polymer gel electrolyte.

The polyglycidol derivative serving as component (c) of the earlier-described pregel composition C is a compound containing units of formula (6) (referred to hereinafter as "A units")

(6)

and units of formula (7) (referred to hereinafter as "B units")

(7)

The ends of the molecular chains on the compound are capped with specific substituents.

The polyglycidol can be prepared by polymerizing glycidol or 3-chloro-1,2-propanediol, although it is generally advisable to carry out polymerization using glycidol as the starting material.

Known processes for carrying out such a polymerization reaction include (1) processes involving the use of a basic catalyst such as sodium hydroxide, potassium hydroxide or any of various amine compounds; and (2) processes involving the use of a Lewis acid catalyst (see A. Dworak et al.: *Macromol. Chem. Phys.* 196, 1963–1970 (1995); and R. Toker: *Macromolecules* 27, 320–322 (1994)).

The total number of A and B units in the polyglycidol is preferably at least two, more preferably at least six, and most preferably at least ten. There is no particular upper limit, although a total number of such groups which does not exceed 10,000 is preferred. The total number of A and B units is preferably low in cases where the polyglycidol must have the flowability of a liquid, and is preferably high where a high viscosity is required.

The order of these A and B units is not regular, but random. Any combination is possible, including, for example, -A-A-A, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw), as determined by gel permeation chromatography (GPC), within a range of preferably 200 to 730,000, more preferably 200 to 100,000, and most preferably 600 to 20,000. Polyglycidol having a weight-average molecular weight of up to about 2,000 is a highly viscous liquid that flows at room temperature, whereas polyglycidol with a weight-average molecular weight above 3.000 is a soft, paste-like solid at room temperature. The average molecular weight ratio (Mw/Mn) is preferably 1.1 to 20, and most preferably 1.1 to 10.

Depending on its molecular weight, the polyglycidol varies in appearance at room temperature (20° C.) from a highly viscous molasses-like liquid to a rubbery solid. The higher the molecular weight, the more the compound, with its low fluidity, qualifies as a solid at room temperature, albeit a soft, paste-like solid.

Regardless of how large or small its molecular weight, the polyglycidol is not a linear polymer. Rather, due to the interlocking of its highly branched molecular chains, it is an amorphous polymer. This is evident from the wide-angle x-ray diffraction pattern, which lacks any peaks indicative of the presence of crystals.

The ratio of A units to B units in the molecule is within a range of preferably 1/9 to 9/1, and especially 3/7 to 7/3.

Because the polyglycldol is colorless, transparent and nontoxic, it can be used in a broad range of applications, such as an electrochemical material, including binder substances for various active materials (e.g., binders in electroluminescent devices), as a thickener, or as an alkylene glycol substitute.

In the practice of the invention, component (c) of pregel composition C is a polyglycidol derivative in which at least 10% of the terminal hydroxyl groups on the molecular chains of the above-described polyglycidol are capped with one or more type of monovalent group selected from among halogen atoms, substituted or unsubstituted monovalent hydrocarbon groups, $R^4CO-$ groups (wherein $R^4$ is a substituted or unsubstituted monovalent hydrocarbon group), $R^4_3Si-$ groups (wherein $R^4$ is as defined above), amino groups, alkylamino groups, $H(OR^5)_m-$ groups (wherein $R^5$ is an alkylene group of 2 to 5 carbons, and the letter m is an integer from 1 to 100), and phosphorus-containing groups. The $R^4$ groups are exemplified as described above. Capping may be carried out using known techniques for introducing various suitable substituents onto hydroxyl end groups.

The polyglycidol derivative serving as component (c) is typically included in an amount of 0.01 to 30 wt %, and preferably 0.5 to 20 wt %, based on the overall polymer gel electrolyte.

The reactive double bond-bearing compound (I) is mixed with above-described component (a), (b) or (c) in a proportion of preferably 1 to 40 wt %, and most preferably 3 to 20 wt %, based on the overall polymer gel electrolyte.

Illustrative examples of the isocyanate group-bearing compound used in pregel compositions made up of (III) an isocyanate group-bearing compound in combination with a to compound having at least two active hydrogens capable of reacting with the isocyanate group include compounds having two or more isocyanate groups, such as methylene diphenyl diisocyanate, polymeric methylene diphenyl diisocyanate, tolylene diisocyanate, xylylene diisocyanate, naphthylene diisocyanate, biphenylene diisocyanate, diphenyl ether diisocyanate, tolidine diisocyanate, hexamethylene diisocyanate, and isophorone diisocyanate.

An isocyanato-terminal polyol compound prepared by reacting the above isocyanate compound with a polyol compound can also be used. Such compounds can be prepared by reacting an isocyanate such as methylene diphenyl diisocyanate or tolylene diisocyanate with one of the polyol compounds listed below.

In this case, the stoichiometric ratio between the isocyanate groups [NCO] on the isocyanate compound and the hydroxyl groups [OH] on the polyol compound is such as to satisfy the condition [NCO]>[OH]. The ratio [NCO]/[OH] is preferably in a range of 1.03/1 to 10/1, and especially 1.10/1 to 5/1.

Suitable examples of the polyol compound include polymeric polyols such as polyethylene glycol, polypropylene glycol and ethylene glycol-propylene glycol copolymers; and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(P-hydroxyethoxy)benzene, p-xylylenediol, phenyl diethanolamine, methyl diethanolamine and 3,9-bis(2-hydroxy-1,1-dimethyl)-2,4,8,10-tetraoxaspiro[5,5]undecane.

Alternatively, instead of the polyol, an amine having two or more active hydrogens may be reacted with the isocyanate. The amine used may be one having a primary or a secondary amino group, although a primary amino group-bearing compound is preferred. Suitable examples include diamines such as ethylenediamine, 1,6-diaminohexane, 1.4-diaminobutane and piperazine; polyamines such as polyethyleneamine; and amino alcohols such as N-methyldiethanolamine and aminoethanol. Of these, diamines in which the functional groups have the same level of reactivity are especially preferred. Here again, the stoichiometric ratio between [NCO] groups on the isocyanate compound and [NH$_2$] and [NH] groups on the amine compound is such as to satisfy the condition [NCO]>[NH$_2$]+[NH].

The above isocyanate group-bearing compound cannot by itself form a three-dimensional network structure. However, a three-dimensional network structure can be formed by reacting the isocyanate group-bearing compound with a compound having at least two active hydrogens, such as an amine, alcohol, carboxylic acid or phenol. Illustrative examples of such compounds having at least two active hydrogens include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1.4-bis(β-hydroxyethoxy)benzene and p-xylylenediol; polyamines such as phenyl diethanolamine, methyl diethanolamine and polyethyleneimine; and polycarboxylic acids.

The isocyanate group-bearing compound and the compound having at least two active hydrogens capable of reacting with the isocyanate group tend to begin reacting at once upon being mixed. To keep this from happening, each compound is separately dehydrated, following which the dehydrated compounds are mixed. The resulting mixture is used as the pregel composition (III).

Isocyanate compounds generally contain little moisture, but because there are compounds of this type which have a polyoxyalkylene structure, such as isocyanato-terminal polyol compounds prepared by the reaction of an isocyanate compound with a polyol compound, it is advantageous to carry out dehydration.

In the practice of the invention, the above-described pregel composition is dehydrated to a moisture content, as measured by Karl Fischer titration, of not more than 1,000 ppm. The dehydrated pregel composition is then used to prepare a polymer gel electrolyte.

Prior to dehydration, the pregel composition has a moisture content, as measured by Karl Fischer titration, within a range of generally 1,000 to 20,000 ppm. The moisture may originate from the starting materials used to prepare the pregel composition or may become admixed during the manufacturing operation.

In the practice of the invention, it is advantageous for the pregel composition to be dehydrated by azeotropic distillation using as the entrainer a nonaqueous solvent for organic electrolytes used in secondary cells and electrical double-layer capacitors, preferably a nonaqueous solvent having a boiling point of at least 60° C., more preferably at least 80° C., and most preferably 100 to 250° C. Illustrative examples of such entrainers include electrochemically stable nonaqueous solvents for organic electrolytes, such as ethyl methyl carbonate, diethyl carbonate, dimethyl carbonate, dimethoxyethane, γ-butyrolactone, ethylene carbonate, butylene carbonate and propylene carbonate. Ethyl methyl carbonate and diethyl carbonate are especially preferred.

The entrainer is added in an amount of preferably 1 to 200 wt %, more preferably 5 to 100 wt %, and most preferably 8 to 30 wt %, based on the pregel composition.

The dehydration conditions are selected as appropriate, although dehydration at a temperature of 20 to 130° C., and preferably 40 to 80° C., is desirable. Dehydration is easier at a higher temperature, but too high a temperature can cause the reactive double bonds to begin polymerizing, which may have the undesirable effect of altering the composition of the polymer electrolyte. A vacuum of about $10^{-2}$ to $10^{-3}$ torr is desirable.

The dehydration method preferably involves adding the entrainer in the above-indicated amount to the pregel composition and carrying out dehydration, then adding the dehydrated pregel composition to a separately prepared organic electrolyte solution so as to form a polymer gel electrolyte-forming solution. Alternatively, the entrainer and a pre-designed organic electrolyte solution may be added to the pregel composition, and dehydration effected by distilling off only the entrainer phase so as to yield a polymer gel electrolyte-forming solution.

In the practice of the invention, a polymer gel electrolyte can be prepared by using the above-described pregel composition having a moisture content of at most 1,000 ppm to induce the gelation of an organic electrolyte of an electrolyte salt in a nonaqueous solvent. The resulting polymer gel electrolyte may be employed as the electrolyte in secondary cells and electrical double-layer capacitors.

The electrolyte salt serving as a constituent of the electrolyte solution in the invention may be any electrolyte salt, including alkali metal salts and quaternary ammonium salts, that is used in such devices as lithium secondary cells, lithium ion secondary cells and electrical double-layer capacitors. Suitable alkali metal salts include lithium salts, sodium salts and potassium salts, and more specifically:

(1) lithium salts such as lithium tetrafluoroborate, lithium hexafluorophosphate, lithium perchlorate, lithium trifluoromethanesulfonate, the sulfonyl imide lithium salts of general formula (8) below

$$(R^{14}-SO_2)(R^{17}-SO_2)NLi \qquad (8),$$

the sulfonyl methide lithium salts of general formula (9) below

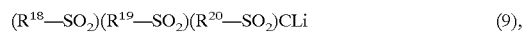

$$(R^{18}-SO_2)(R^{19}-SO_2)(R^{20}-SO_2)CLi \qquad (9),$$

lithium acetate, lithium trifluoroacetate, lithium benzoate, lithium p-toluenesulfonate, lithium nitrate, lithium bromide, lithium iodide and lithium tetraphenylborate;

(2) sodium salts such as sodium perchlorate, sodium iodide, sodium tetrafluoroborate, sodium hexafluorophosphate, sodium trIfluoromethanesulfonate and sodium bromide;

(3) potassium salts such as potassium iodide, potassium tetrafluoroborate, potassium hexafluorophosphate and potassium trifluoromethanesulfonate.

In above formulas (8) and (9), $R^{16}$ to $R^{20}$ are each independently $C_{1-4}$ perfluoroalkyl groups which may have one or two ether linkages.

Illustrative examples of the sulfonyl imide lithium salts of general formula (8) include $(CF_3SO_2)_2NLi$, $(C_2F_5SO_2)_2NLi$. $(C_3F_7SO_2)_2NLi$, $(C_4F_9SO_2)_2NLi$, $(CF_3SO_2)(C_2F_5SO_2)NLi$, $(CF_3SO_2)(C_3F_7SO_2)NLi$, $(CF_3SO_2)(C_4F_9SO_2)NLi$, $(C_2F_5SO_2)(C_3F_7SO_2)NLi$, $(C_2F_5SO_2)(C_4F_9SO_2)NLi$ and $(CF_3OCF_2SO_2)_2NLi$.

Illustrative examples of the sulfonyl methide lithium salts of general formula (9) include $(CF_3SO_2)_3CLi$, $(C_2F_5SO_2)_3CLi$, $(C_3F_7SO_2)_3CLi$, $(C_4F_9SO_2)_3CLi$, $(CF_3SO_2)_2(C_2F_5SO_2)CLi$, $(CF_3SO_2)_2(C_3F_7SO_2)CLi$, $(CF_3SO_2)_2(C_3F_9SO_2)CLi$, $(CF_3SO_2)(C_2F_5SO_2)_2CLi$, $(CF_3SO_2)(C_3F_7SO_2)_2CLi$, $(CF_3SO_2)(C_4F_9SO_2)_2CLi$, $(C_2F_5SO_2)_2(C_3F_7SO_2)CLi$, $(C_2F_5SO_2)_2(C_4F_9SO_2)CLi$ and $(CF_3OCF_2SO_2)_3CLi$.

Suitable quaternary ammonium salts for electrical double-layer capacitors include tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; and also acyclic amidines, cyclic amidines (e.g., imidazoles, imidazolines, pyrimidines, 1,5-diazabicyclo[4.3.0]non-5-ene, 1,8-diazabicyclo[5.4.0]undec-7-ene), pyrroles, pyrazoles, oxazoles, thiazoles, oxadiazoles, thiadiazoles, triazoles, pyridines, pyrazines, triazines, pyrrolidines, morpholines, piperidines and piperazines.

Of the above electrolyte salts, lithium tetrafluoroborate, lithium hexafluorophosphate, sulfonyl imide lithium salts of general formula (8) and sulfonyl methide lithium salts of general formula (9) are preferred for use in lithium-based cells because of their particularly high ionic conductivity and excellent thermal stability. These electrolyte salts may be used singly or as combinations of two or more thereof.

Aside from the above-mentioned electrolyte salts, polymer gel electrolytes to be used in electrical double-layer capacitors may include other electrolyte salts commonly employed in electrical double-layer capacitors. Preferred examples include salts obtained by combining a quaternary onium cation of the general formula $R^{11}R^{12}R^{13}R^{14}N^+$ or $R^{11}R^{12}R^{13}R^{14}P^+$ (wherein $R^{11}$ to $R^{14}$ are each independently alkyls of 1 to 10 carbons) with an anion such as $BF_4^-$, $N(CF_3SO_2)_2^-$, $PF_6^-$, or $ClO_4^-$.

Illustrative examples include $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph-CH_2)PBF_4$ (wherein Ph stands for phenyl), $(C_2H_5)_4PPF_6$, $(C_2H_5)PCF_3SO_2$, $(C_2H_5)_4NBF_4$, $(C_4H_9)_4NBF_4$, $(C_6H_{13})_4NBF_4$, $(C_2H_5)_6NPF_6$, $LiBF_4$ and $LiCF_3SO_3$. These may be used alone or as combinations of two or more thereof.

The concentration of the electrolyte salt in the electrolyte solution is generally 0.05 to 3 mol/L, and preferably 0.1 to 2 mol/L. Too low a concentration may make it impossible to obtain a sufficient ionic conductivity, whereas too high a concentration may prevent complete dissolution in the solvent.

Illustrative examples of the nonaqueous organic solvent used to dissolve the above electrolyte salt include cyclic and acyclic carbonates, acyclic carboxylates, cyclic and acyclic ethers, phosphates, lactone compounds, nitrile compounds and amide compounds, as well as mixtures thereof.

Examples of suitable cyclic carbonates include alkylene carbonates such as propylene carbonate, ethylene carbonate and butylene carbonate. Examples of suitable acyclic carbonates include dialkyl carbonates such as dimethyl carbonate, methyl ethyl carbonate and diethyl carbonate. Examples of suitable acyclic carboxylates include methyl acetate and methyl propionate. Examples of suitable cyclic or acyclic ethers include tetrahydrofuran, 1,3-dioxolane and 1,2-dimethoxyethane. Examples of suitable phosphates include trimethyl phosphate, triethyl phosphate, ethyldimethyl phosphate, diethylmethyl phosphate, tripropyl phosphate, tributyl phosphate, tri(trifluoromethyl) phosphate, tri(trichloromethyl) phosphate, tri(trifluoroethyl) phosphate, tri(perfluoroethyl) phosphate, 2-ethoxy-1,3,2-dioxaphosphoran-2-one, 2-trifluoroethoxy-1,3,2-dioxaphosphoran-2-one and 2-methoxyethoxy-1,3,2-dloxaphosphoran-2-one. An example of a suitable lactone compound is y-butyrolactone. An example of a suitable nitrile compound is acetonitrile. An example of a suitable amide compound is dimethylformamide. Of these, cyclic carbonates, acyclic carbonates, phosphates and mixtures thereof are preferred because they elicit a desirable battery performance such as high charge/discharge characteristics and high output characteristics.

If necessary, any one or more of various types of compounds, such as polyimides, polyacetanols, polyalkylene sulfides, polyalkylene oxides, cellulose esters, polyvinyl alcohols, polybenzoimidazoles, polybenzothiazoles, silicone glycols, vinyl acetate, acrylic acid, methacrylic acid, polyether-modified siloxanes, polyethylene oxides, amide compounds, amine compounds, phosphoric acid compounds and fluorinated nonionic surfactants, may also be included in the electrolyte solution of the invention for such reasons as to lower the resistance at the interface between the positive and negative electrodes and thereby improve the charge/discharge cycle characteristics or to enhance the wettability with the separator. Of these compounds, fluorinated nonionic surfactants are especially preferred.

The secondary cells and electrical double-layer capacitors of the invention are described below.

<Secondary Cells of the Invention>

Secondary cells according to the invention include a positive electrode, a negative electrode and an electrolyte. The above-described polymer gel electrolyte serves as the electrolyte.

The positive electrode is typically produced by coating one or both sides of a positive electrode current collector with a positive electrode binder composition composed primarily of a binder resin and a positive electrode active material. The positive electrode binder composition composed primarily of a binder resin and a positive electrode active material is melted and blended, then extruded as a film to form a positive electrode.

The binder resin may be the above-described pregel composition used to form the polymer gel electrolyte or may be another binder resin commonly employed as an electrode binder resin in secondary batteries. Having the binder resin be composed of the same polymeric material as the inventive pregel composition used to form the polymer gel electrolyte is preferable for lowering the internal resistance of the battery.

The positive electrode current collector may be made of a suitable material such as stainless steel, aluminum, titanium, tantalum or nickel. Of these, aluminum is especially preferred both in terms of performance and cost. The current collector used may be in any of various forms, including foil, expanded metal, sheet, foam, wool, or a three-dimensional structure such as a net.

The positive electrode active material is selected as appropriate for the electrode application, the type of battery and other considerations. For instance, examples of positive electrode active materials that are suitable for use in the positive electrode of a lithium secondary cell include group I metal compounds such as $CuO$, $Cu_2O$, $Ag_2O$, $CuS$ and $CuSO_2$; group IV metal compounds such as $TiS$, $SiO_2$ and $SnO$; group V metal compounds such as $V_2O_5$, $V_6O_{13}$, $VO_x$, $Nb_2O_5$, $Bi_2O_3$ and $Sb_2O_3$; group VI metal compounds such as $CrO_3$, $Cr_2O_3$, $MoO_3$, $MoS_2$, $WO_3$ and $SeO_2$; group VII metal compounds such as $MnO_2$ and $Mn_2O_4$; group VIII metal compounds such as $Fe_2O_3$, $FeO$, $Fe_3O_4$, $Ni_2O_3$, $NiO$ and $CoO_2$; and conductive polymeric compounds such as polypyrrole, polyaniline, poly(p-phenylene), polyacetylene and polyacenes.

Suitable positive electrode active materials that may be used in lithium ion secondary cells include chalcogen compounds capable of adsorbing and releasing lithium ions, and lithium ion-containing chalcogen compounds.

Examples of such chalcogen compounds capable of adsorbing and releasing lithium ions include $FeS_2$, $TiS_2$, $MoS_2$, $V_2O_5$, $V_6O_{13}$ and $MnO_2$.

Specific examples of lithium ion-containing chalcogen compounds include $LiCoO_2$, $LiMnO_2$, $LiMn_2O_4$, $LiMo_2O_4$, $LiV_3O_8$, $LiNiO_2$ and $Li_xNi_yM_{1-y}O_z$ (wherein M is at least one metal element selected from among cobalt, manganese, titanium, chromium, vanadium, aluminum, tin, lead and zinc; $0.05 \leq x \leq 1.10$; and $0.5 \leq y \leq 1.0$).

In addition to the binder resin and the positive electrode active material described above, if necessary, the binder composition for the positive electrode may include also an electrically conductive material. Illustrative examples of the conductive material include carbon black, Ketjenblack, acetylene black, carbon whiskers, carbon fibers, natural graphite, and artificial graphite.

The positive electrode binder composition of the invention typically includes 1,000 to 5,000 parts by weight, and preferably 1,200 to 3,500 parts by weight, of the positive electrode active material and 20 to 500 parts by weight, and preferably 50 to 400 parts by weight, of the conductive material per 100 parts by weight of the binder resin.

Because the positive electrode binder composition of the invention provides good bonding of the positive electrode active material particles and has a high adhesion to the positive electrode current collector, a positive electrode can be produced with the addition of only a small amount of binder resin. The high ionic conductivity of the binder composition when swollen with electrolyte solution allows the internal resistance of the battery to be lowered.

The above-described positive electrode binder composition is generally used together with a dispersant in the form of a paste. Suitable dispersants include polar solvents such as N-methyl-2-pyrrolidone, dimethylformamide, dimethylacetamide and dimethylsulfamide. The dispersant is typically added in an amount of about 30 to 300 parts by weight per 100 parts by weight of the positive electrode binder composition.

No particular limitation is imposed on the method of shaping the positive electrode as a thin film, although it is preferable to apply the composition by a suitable means such as roller coating with an applicator roll, screen coating, doctor blade coating, spin coating or bar coating so as to form an active material layer having a uniform thickness when dry of 10 to 200 $\mu$m, and especially 50 to 150 $\mu$m. When the polymer gel electrolyte-forming pregel composition of the invention is also employed as the positive electrode binder resin, the positive electrode may be fabricated by first shaping the electrode as described above, then immersing it in a plasticizer to induce swelling.

The negative electrode is typically produced by coating one or both sides of a negative electrode current collector with a negative electrode binder composition composed primarily of a binder resin and a negative electrode active material. The same binder resin may be used as in the positive electrode. The negative electrode binder composition composed primarily of a binder resin and a negative electrode active material is melted and blended, then extruded as a film to form a negative electrode.

The negative electrode current collector may be made of a suitable material such as copper, stainless steel, titanium or nickel. Of these, copper is especially preferred both in terms of performance and cost. The current collector used may be in any of various forms, including foil, expanded metal, sheet, foam, wool, or a three-dimensional structure such as a net.

The negative electrode active material is selected as appropriate for the electrode application, the type of battery and other considerations. Active materials suitable for use in the negative electrode of a lithium secondary cell, for example, include alkali metals, alkali metal alloys, carbonaceous materials, and the same materials as mentioned above for the positive electrode active material.

Examples of suitable alkali metals include lithium, sodium and potassium. Examples of suitable alkali metal alloys include Li—Al, Li—Mg, Li—Al—Ni, Na—Hg and Na—Zn.

Examples of suitable carbonaceous materials include graphite, carbon black, coke, glassy carbon, carbon fibers, and sintered bodies obtained from any of these.

In a lithium ion secondary cell, use may be made of a material which reversibly holds and releases lithium ions. Suitable carbonaceous materials capable of reversibly adsorbing and releasing lithium ions include non-graphitizable carbonaceous materials and graphite materials. Specific examples include pyrolytic carbon, coke (e.g., pitch coke, needle coke, petroleum coke), graphites, glassy carbons, fired organic polymeric materials (materials such as phenolic resins or furan resins that have been carbonized by firing at a suitable temperature), carbon fibers, and activated carbon. Other materials capable of reversibly adsorbing and releasing lithium ions which may be used include polymers such as polyacetylene and polypyrrole, and oxides such as $SnO_2$.

In addition to the binder resin and the negative electrode active material described above, if necessary, the binder composition for the negative electrode may include also a conductive material. Illustrative examples of the conductive material include carbon black, Ketjenblack, acetylene black, carbon whiskers, carbon fibers, natural graphite, and artificial graphite.

The negative electrode binder composition typically contains 500 to 1,700 parts by weight, and preferably 700 to 1,300 parts by weight, of the negative electrode active w 20 material and 0 to 70 parts by weight, and preferably 0 to 40 parts by weight, of the conductive material per 100 parts by weight of the binder resin.

The above-described negative electrode binder composition is generally used together with a dispersant in the form of a paste. Suitable dispersants include polar solvents such as N-methyl-2-pyrrolidone, dimethylformamide, dimethylacetamide and dimethylsulfamide. The dispersant is typically added in an amount of about 30 to 300 parts by weight per 100 parts by weight of the negative electrode binder composition.

No particular limitation is imposed on the method of shaping the negative electrode as a thin film, although it is preferable to apply the composition by a suitable means such as roller coating with an applicator roll, screen coating, doctor blade coating, spin coating or bar coating so as to form an active material layer having a uniform thickness when dry of 10 to 200 $\mu$m, and especially 50 to 150 $\mu$m. When the polymer gel electrolyte-forming pregel composition of the invention is also employed as the negative electrode binder resin, the negative electrode may be fabricated by first shaping the electrode as described above, then immersing it in the plasticizer of the invention to induce swelling.

The separator disposed between the resulting positive and negative electrodes is preferably (1) a separator prepared by impregnating a separator base with a polymer electrolyte solution, then carrying out a chemical reaction to effect curing, or (2) the above-described polymer gel electrolyte.

Suitable, non-limiting, examples of the separator base used in the first type of separator (1) include fluoropolymers, polyethers such as polyethylene oxide and polypropylene oxide, polyolefins such as polyethylene and polypropylene, polyacrylonitrile, polyvinylidene chloride, polymethyl methacrylate, polymethyl acrylate, polyvinyl alcohol, polymethacrylonitrile, polyvinyl acetate, polyvinyl pyrrolidone, polyethyleneimine, polybutadiene, polystyrene, polyisoprene, polyurethane and derivatives of any of the above polymers, as well as cellulose, paper and nonwoven fabric. These may be used singly or as combinations of two or more thereof.

Secondary batteries according to the invention are assembled by stacking, fan-folding or winding a cell assembly composed of the positive electrode, the negative electrode, and the separator therebetween, each of the components being prepared as described above. The cell assembly is formed into a laminate or coin-like shape, then placed within a battery housing such as a battery can or a laminate pack. The cell assembly is then filled with a polymer electrolyte solution, and a chemical reaction is carried out to effect curing, following which the battery housing is mechanically sealed if it is a can or heat-sealed if it is a laminate pack.

The resulting secondary batteries of the invention can be operated at a high capacity and a high current without compromising their outstanding performance characteristics, such as an excellent charge/discharge efficiency, high energy density, high output density and long life. Moreover, they have a broad service temperature range. Such qualities make them particularly suitable as lithium secondary cells and lithium ion secondary cells.

The secondary cells according to the invention, such as lithium secondary cells and lithium ion secondary cells, are well-suited for use in a broad range of applications, including main power supplies and memory backup power supplies for portable electronic equipment such as camcorders, notebook computers, mobile phones and what are known as "personal handyphone systems" (PHS) in Japan, uninterruptible power supplies for equipment such as personal computers, in transport devices such as electric cars and hybrid cars, and together with solar cells as energy storage systems for solar power generation.

<Electrical Double-Layer Capacitors of the Invention>

Electrical double-layer capacitors according to the invention include a pair of polarizable electrodes and an electrolyte between the polarizable electrodes. The above-described polymer gel electrolyte serves as the electrolyte.

The polarizable electrodes are each made of a current collector coated with a polarizable electrode binder composition composed primarily of a binder resin and activated carbon. The polarizable electrode binder composition is melted and blended, then extruded as a film to form the polarizable electrodes.

The binder resin may be the above-described pregel composition used to form the polymer gel electrolyte or may be another binder resin commonly employed as an electrode binder resin in electrical double-layer capacitors. Having the binder resin be composed of the same polymeric material as the polymer gel electrolyte-forming pregel composition of the invention is preferable for lowering the internal resistance of the capacitor.

Exemplary activated carbons include those manufactured from plant-based materials such as wood, sawdust, coconut shells and pulp spent liquor; fossil fuel-based materials such as coal and petroleum fuel oil, as well as fibers spun from coal or petroleum-based pitch obtained by the thermal cracking of such fossil fuel-based materials or from tar pitch; and synthetic polymers, phenolic resins, furan resins, polyvinyl chloride resins, polyvinylidene chloride resins, polyimide resins, polyamide resins, liquid-crystal polymers, plastic waste and reclaimed tire rubber. These starting materials are carbonized, then activated.

The activated carbon is preferably in the form of a finely divided powder prepared by subjecting a mesophase pitch-based carbon material, a polyacrylonitrile-based carbon material, a gas phase-grown carbon material, a rayon-based carbon material or a pitch-based carbon material to alkali activation with an alkali metal compound, then grinding the activated carbon material. It is especially preferable to use as the fibrous carbonaceous material a mesophase pitch carbon material, a polyacrylonitrile-based carbon material, a gas phase-grown carbon material, a rayon-based carbon material or a pitch-based carbon material.

The use of an activated carbon having a pore size distribution, as determined from a nitrogen adsorption isotherm, in which pores with a radius of up to 10 Å account for at most 70% of the total pore volume makes it possible to obtain activated carbon with an optimal pore size distribution when a nonaqueous electrolyte solution, and especially an organic electrolyte solution, is used. The organic electrolyte solution penetrates fully to the interior of the pores, allowing cations or anions to adsorb efficiently to the surface of the activated carbon and form an electrical double layer, thus making it possible to store a large amount of electrical energy.

The pore size distribution of the activated carbon is measured by the continuous flow method using nitrogen gas after vacuum outgassing the activated carbon sample. The volume (cc/g) of pores having a radius larger than 10 Å is computed from a desorption isotherm obtained by BJH pore size analysis from a pore distribution plot. The volume (cc/g) of pores with a radius up to 10 Å is computed from an adsorption isotherm obtained by the MP procedure from an MP plot.

In the activated carbon, the volume of pores having a radius up to 10 Å, as determined from a nitrogen adsorption isotherm, accounts for at most 70%, preferably up to 50%, more preferably up to 30%, and most preferably 0 to 30%, of the total pore volume. If the volume of pores having a radius of up to 10 Å is too great, the overall pore volume of the activated carbon becomes too large and the to capacitance per unit volume too small.

The most common pore radius in the pore size a distribution of the activated carbon, as determined from a nitrogen adsorption isotherm, is preferably 15 to 500 Å, more preferably 20 to 200 Å, and most preferably 50 to 120 Å. Moreover, in the activated carbon, preferably at least 50%, more preferably at least 60%, even more preferably at least 70%, and most preferably at least 80%, of the pores with a radius greater than 10 Å have a pore radius within a range of 20 to 400 Å. The proportion of pores with a radius greater than 10 Å which have a radius within a range of 20 to 400 Å may even be 100%.

In addition to satisfying the foregoing pore radius conditions, it is advantageous for the activated carbon to have a specific surface area, as measured by the nitrogen adsorption BET method, of 1 to 500 $m^2/g$, preferably 20 to 300 $m^2/g$, more preferably 20 to 200 $m^2/g$, even more preferably 20 to 150 $m^2/g$, and most preferably 50 to 150 $m^2/g$. If the specific surface area of the activated carbon is too small, the surface area of the activated carbon on which the electrical double layer forms becomes smaller than desirable, resulting in a low capacitance. On the other hand, if the specific surface area is too large, the number of micropores and sub-micropores in the activated carbon which are unable to adsorb ionic molecules increases, in addition to which the electrode density decreases, and with it, the capacitance.

The activated carbon has a cumulative average particle size after grinding of preferably at most 20 $\mu$m, more preferably at most 10 $\mu$m, even more preferably at most 5 $\mu$m, and most preferably 0.1 to 5 $\mu$m. It is especially advantageous for the activated carbon to be in the form of fine particles having a cumulative average particle size of up to 5 $\mu$m, and most preferably 0.1 to 5 $\mu$m, which have been formed by subjecting mesophase pitch-based carbon fibers to alkali activation, then grinding the activated fibers.

"Cumulative average particle size", as used herein, refers to the particle size at the 50% point (median size) on the cumulative curve, based on a value of 100% for the total volume of the powder mass, when the particle size distribution of the finely divided activated carbon is determined.

Subjecting the carbonaceous material to alkali activation followed by grinding allows the cumulative average particle size to be made even smaller. The activated carbon can thus be closely packed into polarizable electrodes for electrical double-layer capacitors, making it possible to raise the electrode density. Moreover, compared with fibrous activated carbon, an electrode coating paste composed of the resulting material can be more readily applied to a current collector and press-formed to easily fabricate electrodes of a uniform thickness.

The amount of activated carbon included in the binder composition for polarizable electrodes is generally 500 to 10,000 parts by weight, and preferably 1,000 to 4,000 parts by weight, per 100 parts by weight of the binder resin. The addition of too much activated carbon may lower the bond strength of the binder composition, resulting in poor adhesion to the current collector. On the other hand, too little activated carbon may have the effect of increasing the electrical resistance, and thus lowering the capacitance, of the polarizable electrodes produced with the composition.

In addition to the binder resin and the activated carbon described above, if necessary, the binder composition for polarizable electrodes may include also a conductive material.

The conductive material may be any suitable material capable of conferring electrical conductivity to the binder composition for polarizable electrodes. Illustrative examples include carbon black, Ketjen black, acetylene black, carbon whiskers, carbon fibers, natural graphite, artificial graphite, titanium oxide, ruthenium oxide, and metallic fibers such as aluminum and nickel. Any one or combinations of two or more thereof may be used. Of these, Ketjen black and acetylene black, which are both types of carbon black, are preferred. The average particle size of the conductive material powder is preferably 10 to 100 nm, and especially 20 to 40 nm.

The conductive material is included in an amount of preferably 0 to 300 parts by weight, and especially 50 to 200 parts by weight, per 100 parts by weight of the binder resin. The presence of too much conductive material in the binder composition reduces the proportion of activated carbon, which may lower the capacitance of polarizable electrodes obtained using the composition. On the other hand, too little conductive material may fail to confer adequate electrical conductivity.

The binder composition for polarizable electrodes is generally used together with a diluting solvent in the form of a paste. Suitable diluting solvents include N-methyl-2-pyrrolidone, acetonitrile, tetrahydrofuran, acetone, methyl ethyl ketone, 1,4-dioxane and ethylene glycol dimethyl ether. The diluting solvent is typically added in an amount of about 30 to 300 parts by weight per 100 parts by weight of the binder composition.

No particular limitation is imposed on the method for shaping the polarizable electrodes as thin films, although it is preferable to apply the composition by a suitable means such as roller coating with an applicator roll, screen coating, doctor blade coating, spin coating or bar coating so as to form an activated carbon layer of a uniform thickness after drying of 10 to 500 μm, and especially 50 to 400 μm. If the inventive pregel composition employed to form the polymer gel electrolyte is used also as the binder resin for the polarizable electrodes, once the polarizable electrodes have been formed as described above, they may be immersed in a plasticizer to effect swelling and thereby give the finished polarizable electrodes.

The separator disposed between the resulting pair of polarizable electrodes is preferably (1) a separator prepared by impregnating a separator base with a polymer electrolyte solution, then carrying out a chemical reaction to effect curing, or (2) the above-described polymer gel electrolyte.

The separator base used in the first type of separator (1) may be composed of a material commonly employed in the separator base for electrical double-layer capacitors. Illustrative examples include polyethylene nonwoven fabric, polypropylene nonwoven fabric, polyester nonwoven fabric, polytetrafluoroethylene porous film, kraft paper, sheet laid from a blend of rayon fibers and sisal fibers, manila hemp sheet, glass fiber sheet, cellulose-based electrolytic paper, paper made from rayon fibers, paper made from a blend of cellulose and glass fibers, and combinations thereof in the form of multilayer sheets.

Electrical double-layer capacitors according to the invention are assembled by stacking, fan-folding or winding an electrical double-layer capacitor assembly composed of a pair of polarizable electrodes with a separator therebetween, each of the components being prepared as described above. The capacitor assembly is formed into a coin-like or laminate shape, then placed within a capacitor housing such as a capacitor can or a laminate pack. The assembly is then filled with a polymer electrolyte solution, and cured by a chemical reaction, following which the capacitor housing is mechanically sealed if it is a can or heat-sealed if it is a laminate pack.

The resulting electrical double-layer capacitors of the invention have a high output voltage, a large output current and a broad service temperature range without compromising such outstanding characteristics as their excellent charge/discharge efficiency, high energy density, high output density and long life.

The electrical double-layer capacitors of the invention are highly suitable for use in a broad range of applications, including memory backup power supplies for electronic equipment such as personal computers and wireless terminals, uninterruptible power supplies for personal computers and other equipment, in transport devices such as electric cars and hybrid cars, together with solar cells as energy storage systems for solar power generation, and in combination with batteries as load-leveling power supplies.

EXAMPLES

The following synthesis examples, examples of the invention and comparative examples are provided to illustrate the invention, and are not intended to limit the scope thereof.

Synthesis Example 1
Synthesis of Unsaturated Polyurethane Compound

A reactor equipped with a stirrer, a thermometer and a condenser was charged with 870 parts by weight of a dehydrated ethylene oxide (EO)/propylene oxide (PO) random copolymer diol (molar ratio of EO/PO=7/3) having a hydroxyl number of 36.1, 107.4 parts by weight of 4,4'-diphenylmethane diisocyanate, and 100 parts by weight of methyl ethyl ketone as the solvent. These ingredients were mixed by 3 hours of stirring at 80° C., giving a polyurethane prepolymer with isocyanate end groups.

Next, the entire reactor was cooled to 50° C., then 0.3 part by weight of benzoquinone, 5 parts by weight of dibutyltin laurate, 16.3 parts by weight of hydroxyethyl acrylate and 6.3 parts by weight of 1,4-butanediol were added, and the ingredients were reacted at 50° C. for 3 hours. The methyl ethyl ketone was subsequently removed under a vacuum, yielding an unsaturated polyurethane compound.

The weight-average molecular weight of the resulting unsaturated polyurethane compound was measured by gel permeation chromatography, and the distributions were found to be 17,300 and 6,200.

Synthesis Example 2
Synthesis of Cellulose Derivative

Eight grams of hydroxypropyl cellulose (molar substitution, 4.65; product of Nippon Soda Co., Ltd.) was suspended in 400 mL of acrylonitrile, following which 1 mL of 4 wt % aqueous sodium hydroxide was added and the mixture was stirred 4 hours at 30° C.

The reaction mixture was then neutralized with acetic acid and poured into a large amount of methanol, giving cyanoethylated hydroxypropyl cellulose.

To remove impurities, the cyanoethylated hydroxypropyl cellulose was dissolved in acetone, following which the solution was placed in a dialysis membrane tube and purified by dialysis using ion-exchanged water. The cyanoethylated hydroxypropyl cellulose which settled out during dialysis was collected and dried.

Elemental analysis of the resulting cyanoethylated hydroxypropyl cellulose indicated a nitrogen content of 7.3 wt %. Based on this value, the proportion of the hydroxyl groups on the hydroxypropyl cellulose that were capped with cyanoethyl groups was 94%.

Example 1

A reactor equipped with a stirrer was charged with 60 parts by weight of the unsaturated polyurethane compound prepared in Synthesis Example 1, 30 parts by weight of methoxy polyethylene glycol monomethacrylate (number of oxyethylene units=9) and 9 parts by weight of ethyl methyl carbonate as the entrainer for azeotropic distillation. The moisture content in this state was 14,560 ppm. The system was then evacuated with a vacuum pump, after which azeotropic dehydration was carried out under stirring and at a temperature of 60° C. for a period of 0.5 hour while introducing a small amount of dry air through a capillary tube, thereby yielding a pregel composition. The amount of azeotrope recovered by cooling with liquefied nitrogen was 9.02 parts by weight.

Following dehydration, the moisture level of the pregel composition was measured by Karl Fischer titration and the viscosity was measured with a Brookfield viscometer. The results are shown in Table 1.

Preparation of Ion-Conductive Polymer Electrolyte Solution:

An electrolyte solution was prepared by dissolving 1.43 mol/kg of lithium hexafluorophosphate ($LiPF_6$) as the supporting electrolyte salt in a 1:1 volumetric mixture of ethylene carbonate and diethyl carbonate as the nonaqueous solvent. Next, 10 parts by weight of the pregel composition prepared in Example 1 was added to 90 parts of the electrolyte solution, following which 0.5 part by weight of azobisisobutyronitrile was also added, thereby yielding a polymer electrolyte solution.

That is, the lithium hexafluorophosphate ($LiPF_6$) serving as the electrolyte was charged in an amount of one mole per kilogram of the combined weight of lithium hexafluorophosphate, nonaqueous solvent, unsaturated polyurethane compound, methoxypolyethylene glycol monomethacrylate and azobisisobutyronitrile, or 1.43 mol $LiPF_6$/kg.

Secondary Battery Production:

[Fabrication of Positive Electrode]

Ninety parts by weight of $LiCoO_2$ as the positive electrode active material, 6 parts by weight of Ketjen black as the conductive material, 40 parts by weight of a resin solution prepared beforehand by dissolving 10 parts by weight of polyvinylidene fluoride in 90 parts by weight of N-methyl-2-pyrrolidone, and 20 parts by weight of N-methyl-2-pyrrolidone were stirred and blended to give a paste-like positive electrode binder composition. The composition was coated onto aluminum foil with a doctor blade to a dry film thickness of 100 μm, then dried at 80° C. for 2 hours to form a positive electrode.

[Fabrication of Negative Electrode]

Ninety parts by weight of mesocarbon microbeads (MCMB6-28, produced by Osaka Gas Chemicals Co., Ltd.) as the negative electrode active material, 100 parts by weight of a resin solution prepared beforehand by dissolving 10 parts by weight of polyvinylidene fluoride in 90 parts by weight of N-methyl-2-pyroolidone, and parts of N-methyl-2-pyrrolidone were stirred and blended to give a paste-like negative electrode binder composition. The composition was coated onto copper foil with a doctor blade to a dry film thickness of 100 μm, then dried at 80° C. for 2 hours to form a negative electrode.

A separator base was placed between the positive and negative electrodes fabricated above. The polymer electrolyte solution of Example 1 was introduced into the resulting cell assembly, following which the laminate pack was sealed and heated at 80° C. for 2 hours to effect curing via a chemical reaction, thereby giving a laminate-type secondary battery.

Charge/Discharge Test:

The laminate-type secondary battery produced in Example 1 was subjected to a 200-cycle charge/discharge test in which the upper limit voltage during charging was set at 4.2 V, the final voltage during discharging was set at 3 V, and the test was carried out at a constant current under a current density of 0.5 $mA/cm^2$. The cycle deterioration was calculated as the ratio of the capacitance in the 200th charge-discharge cycle to the capacitance in the first cycle. The results are shown in Table 1.

Example 2

A vessel was charged with 6 parts by weight of the cellulose derivative prepared in Synthesis Example 2, 60 parts by weight of the unsaturated polyurethane compound prepared in Synthesis Example 1, 30 parts by weight of methoxy polyethylene glycol monomethacrylate (number of oxyethylene units=9) and 9 parts by weight of ethyl methyl carbonate as the entrainer for azeotropic distillation, following which the components were stirred to effect dissolution. The moisture content was 16,880 ppm.

The resulting mixed solution was charged into a reactor equipped with a stirrer, following which the system was evacuated with a vacuum pump and azeotropic dehydration was carried out under stirring and at a temperature of 60° C. for a period of 0.5 hour while introducing a small amount of dry air through a capillary tube, thereby yielding a pregel composition. The amount of azeotrope recovered by cooling with liquefied nitrogen was 9.03 parts by weight. The resulting pregel composition was used to produce a secondary battery in the same way as in Example 1. The battery thus obtained was similarly tested and evaluated. The results are given in Table 1.

Example 3

Aside from using diethyl carbonate instead of ethyl methyl carbonate, azeotropic dehydration was carried out in the same way as in Example 1, yielding a pregel composition. The pregel composition was used to produce a secondary battery in the same way as in Example 1, following which the battery was similarly tested and evaluated. The results are given in Table 1.

Comparative Example 1

A vessel was charged with 60 parts by weight of the unsaturated polyurethane compound prepared in Synthesis Example 1, 30 parts by weight of methoxy polyethylene glycol monomethacrylate (number of oxyethylene units=9) and 45 parts by weight of methanol as a co-solvent. The moisture content was 14,560 ppm. To this was added a sodium-type molecular sieve 4A that had been dehydrated beforehand by 12 hours of heating at 200° C., following which the vessel contents were left to stand for 5 days to effect dehydration. The methanol was subsequently distilled off at 60° C. The resulting composition was used to produce a secondary battery in the same way as in Example 1, following which the battery was similarly tested and evaluated. The results are given in Table 1.

Comparative Example 2

A vessel equipped with a stirrer was charged with 60 parts by weight of the unsaturated polyurethane compound prepared in Synthesis Example 1 and 30 parts by weight of methoxy polyethylene glycol monomethacrylate (number of oxyethylene units=9). The moisture content was 14,560 ppm. The system was evacuated with a vacuum pump, and dehydration was carried out under stirring and at a temperature of 80° C. for a period of 15 hours while introducing a small amount of dry air through a capillary tube. The resulting composition was used to produce a secondary battery in the same way as in Example 1, following which the battery was similarly tested and evaluated. The results are given in Table 1.

TABLE 1

|  | Moisture content | Viscosity (cP) | Charge/discharge cycle deterioration (%) |
|---|---|---|---|
| Example 1 | 40 | 213 | 90 |
| Example 2 | 48 | 356 | 87 |
| Example 3 | 42 | 217 | 87 |
| Comparative Example 1 | 104 | 205 | 68 |
| Comparative Example 2 | 160 | 8,520 | 49 |

As described above and demonstrated in the foregoing examples, the invention is able to provide pregel compositions having a low moisture content. Polymer gel electrolytes prepared with such pregel compositions have a high electrochemical stability, and are thus highly suitable for use in secondary cells and electrical double-layer capacitors.

Japanese Patent Application No. 2000-062832 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A pregel composition comprising at least one linear or branched polymeric compound and a compound having a reactive double bond which, when added to an organic electrolyte solution of an electrolyte salt in a nonaqueous solvent, causes the solution to gel and form a polymer gel electrolyte;

wherein the composition has a moisture content, as determined by Karl Fischer titration, of not more than 100 ppm, and the linear or branched polymeric compound is one type of polymer selected from the class consisting of (a) a hydroxyalkyl polysaccharide derivative, (b) a polyvinyl alcohol derivative and (c) a polyglycidol derivative.

2. A pregel composition comprising at least one isocyanate compound which, when added to an organic electrolyte solution of an electrolyte salt in a nonaqueous solvent, causes the solution to gel and form a polymer gel electrolyte; wherein the composition has a moisture content, as determined by Karl Fischer titration, of not more than 100 ppm.

3. The pregel composition of claim 1 which is prepared by azeotropic distillation in the presence of an entrainer that is the nonaqueous solvent in the organic electrolyte solution.

4. A method of dehydrating a pregel composition which, when added to an organic electrolyte solution of an electrolyte salt in a nonaqueous solvent, causes the solution to gel and form a polymer gel electrolyte, the method comprising the step of subjecting the pregel composition to azeotropic distillation in the presence of an entrainer that is the nonaqueous solvent in the organic electrolyte solution, for thereby lowering the moisture content of the pregel composition, as determined by Karl Fischer titration, to not more than 1,000 ppm.

5. A secondary cell comprising a positive electrode, a negative electrode and an electrolyte, wherein the electrolyte is a polymer gel electrolyte prepared by adding the pregel composition of any one of claims 1, 2, 3 to an organic electrolyte solution of an electrolyte salt in a nonaqueous solvent, thereby inducing gelation.

6. An electrical double-layer capacitor comprising an electrolyte between a pair of polarizable electrodes, wherein the electrolyte is a polymer gel electrolyte prepared by adding the pregel composition of any one of claims 1, 2, 3 to an organic electrolyte solution of an electrolyte salt in a nonaqueous solvent, thereby inducing gelation.

* * * * *